(12) United States Patent
Yi et al.

(10) Patent No.: US 11,390,248 B2
(45) Date of Patent: Jul. 19, 2022

(54) GATEWAY DEVICE, VEHICLE AND REMOTE CONTROL SYSTEM INCLUDING THE SAME

(71) Applicants: HYUNDAI MOTOR COMPANY, Seoul (KR); KIA MOTORS CORPORATION, Seoul (KR)

(72) Inventors: Kichang Yi, Suwon-si (KR); Hyoung Shin, Yongin-si (KR); Youngwook Song, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 208 days.

(21) Appl. No.: 16/668,284

(22) Filed: Oct. 30, 2019

(65) Prior Publication Data

US 2020/0148169 A1 May 14, 2020

(30) Foreign Application Priority Data

Nov. 14, 2018 (KR) .......................... 10-2018-0139970

(51) Int. Cl.
*B60R 25/24* (2013.01)
*B60R 25/20* (2013.01)

(52) U.S. Cl.
CPC ............ *B60R 25/24* (2013.01); *B60R 25/209* (2013.01); *B60R 2325/101* (2013.01); *B60R 2325/205* (2013.01)

(58) Field of Classification Search
CPC .. G07C 2009/00373; G07C 2009/0038; G07C 2009/00388; G07C 2009/00396; G07C 2009/00404; G07C 9/00309; G07C 2009/00865; G07C 9/00571; G08C 2201/93; H04W 8/005; H04L 67/125; H04L 67/141; H04L 67/143; H04L 12/66;
(Continued)

(56) References Cited

U.S. PATENT DOCUMENTS 10,766,453 B2* 9/2020 Beyer .................... B60R 25/045
10,793,109 B2* 10/2020 Salah ...................... B60R 25/24
(Continued)

FOREIGN PATENT DOCUMENTS

DE 102010061111 A1 6/2012
EP 2 048 629 A2 4/2009
(Continued)

OTHER PUBLICATIONS

Extended European Search Report dated Mar. 10, 2020 in corresponding European Patent Application No. EP 19 20 6127.
(Continued)

*Primary Examiner* — Brian E Miller
(74) *Attorney, Agent, or Firm* — Fox Rothschild LLP

(57) ABSTRACT

A gateway device includes: a communicator configured to communicate with a user terminal and a smart key device; and a controller configured to; transmit a search signal for communication connection through the communicator; transmit a turn-on signal to the smart key device when a response signal corresponding to the search signal is received from the user terminal; and control the communicator to transmit a control signal to the smart key device when the control signal is received from the user terminal.

13 Claims, 5 Drawing Sheets

(58) Field of Classification Search
CPC ....... E05B 83/36; E05B 81/00; B60R 25/209;
B60R 25/01; B60R 25/24; B60R
2325/101; B60R 2325/205; B60R
2325/106; B60R 2325/103; E05F 15/77;
E05Y 2400/664; E05Y 2900/531; E05Y
2400/85; E05Y 2400/45; B60Y 2200/11;
H04M 1/72415; H04M 1/72412
See application file for complete search history.

(56) References Cited

U.S. PATENT DOCUMENTS

| | | | | |
|---|---|---|---|---|
| 2011/0257817 A1* | 10/2011 | Tieman | ............... | B60R 25/24 |
| | | | | 701/2 |
| 2012/0252364 A1* | 10/2012 | Inabathuni | ............ | G08C 17/02 |
| | | | | 455/41.2 |
| 2012/0310447 A1* | 12/2012 | Toki | ............... | B60R 25/24 |
| | | | | 701/2 |
| 2014/0342668 A1 | 11/2014 | Kyomitsu | | |
| 2014/0365032 A1* | 12/2014 | Park | ............... | G07C 9/00182 |
| | | | | 701/2 |
| 2015/0281426 A1* | 10/2015 | Kwark | ............... | B60R 25/24 |
| | | | | 455/420 |
| 2015/0312398 A1* | 10/2015 | Li | ............... | H04W 4/025 |
| | | | | 455/420 |
| 2016/0127892 A1* | 5/2016 | Huang | ............... | H04M 15/56 |
| | | | | 726/29 |
| 2016/0169687 A1* | 6/2016 | Yu | ............... | G01C 21/3688 |
| | | | | 701/468 |
| 2016/0368455 A1* | 12/2016 | Kim | ............... | B60R 25/25 |
| 2017/0249791 A1* | 8/2017 | Woo | ............... | G07C 9/00309 |
| 2017/0282858 A1* | 10/2017 | Sass | ............... | H01Q 1/3283 |
| 2018/0095439 A1* | 4/2018 | Karbasian | ............ | G05B 19/0426 |
| 2018/0103414 A1* | 4/2018 | Golsch | ............ | H04W 4/30 |
| 2018/0154774 A1* | 6/2018 | Park | ............... | G06F 3/017 |
| 2018/0154865 A1* | 6/2018 | Bianchi, III | ............ | B60R 25/24 |
| 2018/0268629 A1* | 9/2018 | Jain | ............... | G07C 9/00309 |
| 2018/0297558 A1* | 10/2018 | Froitzheim | ............ | E05B 83/36 |
| 2019/0217816 A1* | 7/2019 | Lee | ............... | H04W 4/40 |
| 2019/0347402 A1* | 11/2019 | Hamada | ............ | G06N 20/10 |
| 2020/0148169 A1* | 5/2020 | Yi | ............... | G07C 9/00309 |
| 2020/0236494 A1* | 7/2020 | Ronan | ............ | H04W 4/80 |
| 2020/0269834 A1* | 8/2020 | Hara | ............... | B60W 30/06 |
| 2021/0239823 A1* | 8/2021 | VanBlon | ............ | H04W 4/80 |

FOREIGN PATENT DOCUMENTS

| | | |
|---|---|---|
| EP | 2 048 629 A3 | 8/2012 |
| KR | 10-1558778 B1 | 10/2015 |
| KR | 10-2017-0025769 A | 8/2017 |

OTHER PUBLICATIONS

European Office Action for European Patent Application Nmber 19206127.3, dated Jan. 31, 2022, 6 pages.

* cited by examiner

GATEWAY DEVICE, VEHICLE AND REMOTE CONTROL SYSTEM INCLUDING THE SAME

CROSS-REFERENCE TO RELATED APPLICATION(S)

This application is based on and claims priority under 35 U.S.C. § 119 to Korean Patent Application No. 10-2018-0139970, filed on Nov. 14, 2018 in the Korean Intellectual Property Office, the disclosure of which is incorporated by reference in its entirety.

TECHNICAL FIELD

Embodiments of the disclosure relate to a gateway device for performing communication with a user terminal, and a vehicle and a remote control system including the same.

BACKGROUND

A smart key system is capable of opening and closing a vehicle door and starting the vehicle from the outside without a driver having to insert a separate key into a key box of the vehicle or to perform any special operation, and a smart key such as a FOB for wireless communication is used. Recently, a remote control system for controlling functions of the vehicle from the outside using a user terminal such as a smartphone has been developed without using the smart key.

SUMMARY

Therefore, it is an aspect of the disclosure to provide a gateway device capable of performing communication with a user terminal, and a vehicle and a remote control system including the same.

Additional aspects of the disclosure will be set forth in part in the description which follows and, in part, will be obvious from the description, or may be learned by practice of the disclosure.

In accordance with an aspect of the disclosure, a gateway device includes: a communicator configured to communicate with a user terminal and a smart key device; and a controller configured to: transmit a search signal for communication connection through the communicator; transmit a turn-on signal to the smart key device when a response signal corresponding to the search signal is received from the user terminal; and control the communicator to transmit a control signal to the smart key device when the control signal is received from the user terminal.

The controller may confirm whether the communication connection with the user terminal is released, and may transmit a turn-off signal to the smart key device when the communication connection with the user terminal is released.

The communicator may communicate with the smart key device through a connector including an electrically conductive material.

The connector may be provided to be attached to the smart key device.

The communicator may communicate with the user terminal through Bluetooth. The user terminal may include a first user terminal which is a master device and a second user terminal which is a slave device.

In accordance with another aspect of the present disclosure, a vehicle includes: a vehicle communicator; an electronic device configured to provide at least one function; a smart key device configured to communicate with the vehicle communicator; a gateway device configured to transmit a turn-on signal to the smart key device when communication connection with a user terminal is established and to transmit a control signal to the smart key device when the control signal is received from the user terminal; and a controller configured to control the electronic device based on the control signal when the control signal is received from the smart key device.

The gateway device may confirm whether the communication connection with the user terminal is released, and may transmit a turn-off signal to the smart key device when the communication connection with the user terminal is released.

The gateway device may communicate with the smart key device through a connector including an electrically conductive material.

The connector may be provided to be attached to the smart key device.

The vehicle may further include: a power supply including a battery. The gateway device may receive power from the battery.

In accordance with another aspect of the present disclosure, a remote control system includes: a user terminal configured to receive a control signal for a vehicle from a user; a smart key device configured to communicate with the vehicle; and a gateway device configured to: transmit a search signal for communication connection; transmit a turn-on signal to the smart key device when a response signal corresponding to the search signal is received from the user terminal; and transmit the control signal to the smart key device when the control signal is received from the user terminal.

The gateway device may confirm whether the communication connection with the user terminal is released, and may transmit a turn-off signal to the smart key device when the communication connection with the user terminal is released.

The gateway device may communicate with the smart key device through a connector including an electrically conductive material.

The connector may be provided to be attached to the smart key device.

The gateway device may communicate with the user terminal through Bluetooth. The user terminal may include a first user terminal which is a master device and a second user terminal which is a slave device.

The remote control system may further include: a server configured to transmit connection information for communicating with the gateway device to the first user terminal.

The server may transmit an approval request to the first user terminal when a user addition request is received from the second user terminal.

The server may transmit the connection information to the second user terminal when the approval request is received from the first user terminal.

The server may transmit a communication connection release command to the second user terminal when an additional user exclusion request is received from the first user terminal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
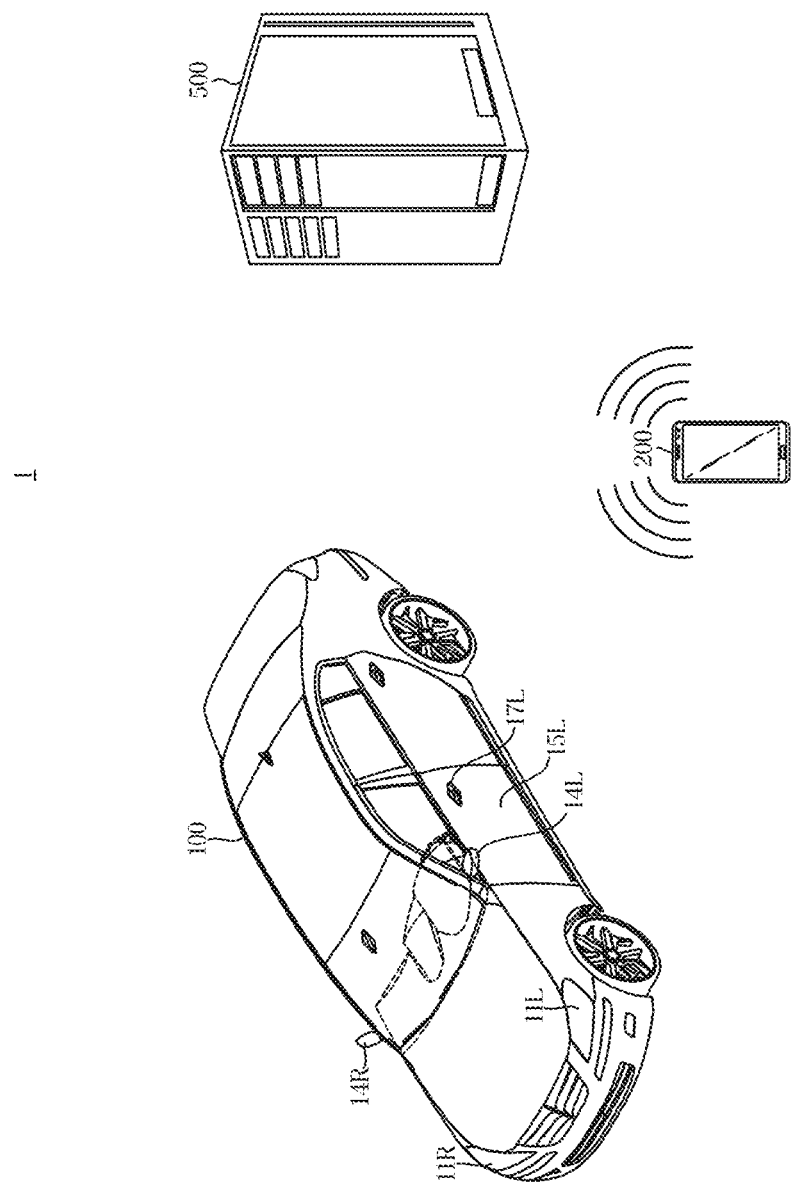
FIG. 1 is a view illustrating a remote control system according to an embodiment.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each of the steps may be implemented in an order different from the illustrated order unless the context clearly indicates otherwise.

The principle and embodiments of the disclosure will now be described with reference to the accompanying drawings.

FIG. 1 is a view illustrating a remote control system according to an embodiment.

Referring to FIG. 1, a remote control system 1 may include a vehicle 100, a user terminal 200, and a server 500.

The vehicle 100 may receive various control signals from the user terminal 200 to provide a user with various user-friendly functions such as remote control through the user terminal 200.

For example, when a touch sensor of doors 15L and 15R detects the user's touch input while the user is holding the user terminal 200 registered in the vehicle 100, the vehicle 100 may perform authentication with the user terminal 200 through a wireless communication network. When the authentication is completed, a door lock of the vehicle 100 is released and the doors 15L and 15R may be opened by pulling handles 17L and 17R. Here, the user may include not only a driver but also a passenger on board the vehicle 100, which means a person who possess the user terminal 200.

When it is confirmed that a position of the user terminal 200 is close to the vehicle 100, the vehicle 100 may also provide a welcome light function such as turning on lamps provided to headlamps 11L and 11R or the handles 17L and 17R of the vehicle 100.

In order to provide such various user-friendly functions, the vehicle 100 may receive the various control signals from the user terminal 200, and may control the configuration inside the vehicle 100 based on the received control signals.

Meanwhile, the server 500 may perform the authentication with the user terminal 200 through the wireless communication network, and may transmit the authentication of the user terminal 200 to the vehicle 100 through the wireless communication network. To this end, the server 500 may store user information for the authentication of the user terminal 200.

At this time, the user information may refer to information for identifying the user, and may include at least one of unique information about the user, vehicle information, or gateway device information. In this case, the gateway device information may refer to unique information of a gateway device 300 (see FIG. 2), and may include, for example, product code information.

The vehicle 100, the user terminal 200, and the server 500 may be connected through a short-range communication network. Here, the short-range communication network may include a wireless local access network (WLAN), wireless fidelity (Wi-Fi), Bluetooth, Zigbee, Wi-Fi direct, ultra-wide band (UWB), infrared data association (IrDA), Bluetooth low energy (BLE), near field communication (NFC), radio frequency identification (RFID), and the like, without being limited thereto.

Meanwhile, the user terminal 200 may be implemented as a computer or a portable terminal capable of accessing the vehicle 100 or the server 500 through a network. Here, the computer may include, for example, a notebook, a desktop, a laptop, a tablet PC, a slate PC, and the like, each of which is equipped with a WEB Browser. The user terminal 200 may include, for example, a wearable device such as a Personal Communication System (PCS), or the like as a wireless communication device that is guaranteed to be portable and mobile. The portable terminal may be any type of handheld based wireless communication device such as a Personal Communication System (PCS), Global System for Mobile communications (GSM), Personal Digital Cellular (PDC), Personal Handyphone System (PHS), Personal Digital Assistant (PDA), International Mobile Telecommunications (IMT)-2000, Code Division Multiple Access (CDMA)-2000, W-Code Division Multiple Access (W-CDMA), Wireless Broadband (WiBro) Internet terminal, a smart phone, etc., a wearable device such as a watch, a ring, a bracelet, an anklet, a necklace, a pair of glasses, and a contact lens, or a head-mounted-device (HMD).

In an implementation of a remote control system for controlling functions of the vehicle from the outside using a user terminal, the remote control system using a smart phone may be installed without integration with a smart key system provided in a vehicle. In this implementation, to install the remote control system major changes in the vehicle are required as the remote control system does not use a smart key system provided and existing in a vehicle.

Accordingly, there is a need to implement the remote control system 1 that performs remote control using the user terminal 200 without significant changes to the vehicle by using the smart key system provided in the vehicle.

The remote control system 1 according to an embodiment may implement a remote control environment using the user terminal 200 more easily because a smart key device 400 included in the smart key system that is installed in the vehicle 100 and the gateway device 300 are connected each other and communicate with the user terminal 200.

Hereinafter, the remote control system 1 according to an embodiment will be described in detail with reference to FIGS. 2 and 3.

Figure 2:
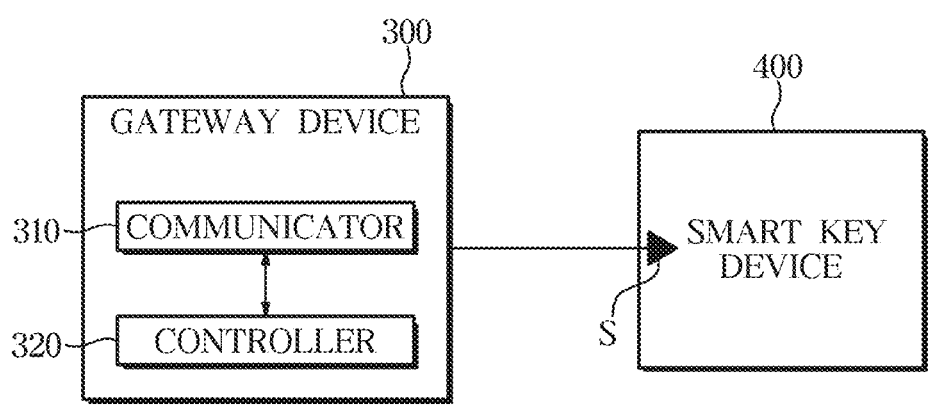
FIG. 2 is a control block diagram of a gateway device and a smart key device according to an embodiment.
Figure 3:
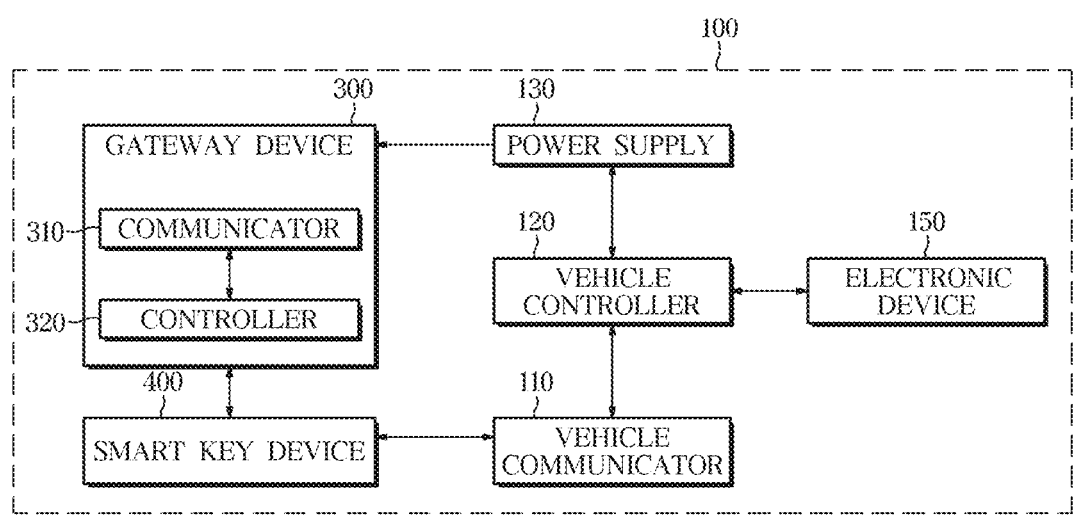
FIG. 3 is a control block diagram of a vehicle according to an embodiment.

FIG. 2 is a control block diagram of a gateway device and a smart key device according to an embodiment, and FIG. 3 is a control block diagram of a vehicle according to an embodiment.

Referring to FIG. 2, the gateway device 300 according to an embodiment may be connected to the smart key device 400 and may include a communicator 310 and a controller 320.

The communicator 310 may communicate with at least one of the user terminal 200 or the smart key device 400. The communicator 310 may transmit and receive various information related to the user terminal 200 or the smart key device 400.

The communicator 310 may transmit various control signals received from the user terminal 200 to the smart key device 400. Particularly, the communicator 310 may transmit various control signals including a turn-on signal and a turn-off signal received from the user terminal 200 as well as control commands for at least one function to the smart key device 400.

Also, the communicator 310 may transmit a search signal for communication connection and may receive a response signal corresponding to the search signal from the user terminal 200. At this time, the search signal may refer to an advertising packet.

The communicator 310 may communicate with the smart key device 400 through a connector S. The connector S may be provided to be attached to the smart key device 400 and may transmit various signals transmitted by the communicator 310 to the smart key device 400. At this time, the connector S may be attached to at least one terminal of the smart key device 400 and may transmit a control signal or the like to the smart key device 400. The connector S may include a pin contactor and an insulator. At this time, the pin contactor may be connected to at least one terminal of the smart key device 400. The insulator may include an insulating material to prevent shorting of terminals connected to other configurations of the smart key device 400.

In addition, the connector S may include a wire for connecting the gateway device 300 and the smart key device 400.

To this end, the connector S may be implemented as an electrically conductive material. For example, the connector S may be implemented as an electrically conductive silicon material capable of transmitting an electrical signal. However, the disclosure is not limited thereto, and the connector S may be implemented as any the electrically conductive material capable of transmitting the electrical signal.

The communicator 310 may include one or more components that enable communication with an external device, for example, at least one of a short-range communication module, a wired communication module, and a wireless communication module.

The short-range communication module may include various short-range communication modules for transmitting and receiving signals within a short range over a wireless communication network, such as a Bluetooth module, an infrared communication module, a radio frequency identification (RFID) communication module, a wireless local access network (WLAN) communication module, a near field communication (NFC) module, a Zigbee communication module, etc.

The wired communication module may include not only one of the various wired communication modules, such as a controller area network (CAN) communication module, a local area network (LAN) module, a wide area network (WAN) module, or a value added network (VAN) module, but also one of various cable communication modules, such as a universal serial bus (USB), a high definition multimedia interface (HDMI), a digital visual interface (DVI), recommended standard (RS) 232, a power cable, or plain old telephone service (POTS).

The wireless communication module may include a wireless fidelity (WiFi) module, a wireless broadband (WiBro) module, and/or any wireless communication module for supporting various wireless communication schemes, such as a global system for a mobile communication (GSM) module, a code division multiple access (CDMA) module, a wideband code division multiple access (WCDMA) module, a universal mobile telecommunications system (UMTS), a time division multiple access (TDMA) module, a long-term evolution (LTE) module, etc.

The wireless communication module may include a wireless communication interface including an antenna and a transmitter for transmitting signals. The wireless communication module may further include a signal conversion module for modulating a digital control signal output from the controller 320 through the wireless communication interface into an analog type wireless signal under the control of the controller 320.

The wireless communication module may include a wireless communication interface including an antenna and a receiver for receiving signals. The wireless communication module may further include a signal conversion module for demodulating the analog type wireless signal received through the wireless communication interface into the digital control signal.

The controller 320 may control the communicator 310 to transmit the search signal for communication connection. At this time, the search signal may refer to the advertising packet.

The controller 320 may control the communicator 310 to transmit the turn-on signal to the smart key device 400 when the communicator 310 receives the response signal corresponding to the search signal from the user terminal 200. The smart key device 400 may be turned on based on the turn-on signal.

At this time, the controller 320 transmits the turn-on signal to the smart key device 400 based on the response signal received from the user terminal 200 authenticated by the server 500, thereby blocking access of the smart key device 400 to unauthorized users.

When the controller 320 receives the control signal from the user terminal 200, the controller 320 may control the communicator 310 to transmit the received control signal to the smart key device 400. The controller 320 may transmit the control signal received from the user terminal 200 to the smart key device 400 through the communicator 310.

To this end, the controller 320 may confirm whether or not communication connection is established with the user terminal 200. Particularly, when the controller 320 receives the response signal corresponding to the search signal from the user terminal 200, it may be confirmed that the controller 320 is connected to the user terminal 200.

In addition, the controller 320 may confirm whether or not the communication connection is released after the communication connection with the user terminal 200 is established.

When the communication connection with the user terminal is released, the controller 320 may transmit the turn-off signal to the smart key device 400, and the smart key device 400 may be turned off.

The controller 320 may be implemented with one or more memories storing an algorithm to control the operation of the components in the gateway device 300 or data about a program that implements the algorithm, and one of more processors carrying out the aforementioned operation using the data stored in the memory. The memory and the processor may be implemented in separate chips. Alternatively, the memory and the processor may be implemented in a single chip.

The smart key device 400 may include various configurations for processing control signals. The smart key device 400 may include a printed circuit board (PCB) for providing a smart key function. The smart key device 400 may include at least one switch, and the at least one switch may include at least one terminal.

The smart key device 400 may be implemented as the PCB that provides the smart key functions used in the existing smart key system, and may be implemented by the remote control system 1 such that the control signal input to the user terminal 200 is transmitted to an electronic device of the vehicle 100 through the gateway device 300 by attaching the connector S to the PCB of the existing smart key system.

Referring to FIG. 3, the vehicle 100 according to an embodiment may include a vehicle communicator 110, a vehicle controller 120, a power supply 130, and an electronic device 150, as well as the gateway device 300 and the smart key device 400 described above.

The vehicle communicator 110 may communicate with the smart key device 400. Particularly, the vehicle communicator 110 may receive the control signal related to the vehicle 100 from the smart key device 400 and may transmit the control signal to the vehicle controller 120.

To this end, the vehicle communicator 110 may include one or more components that enable communication with the external device, for example, at least one of the short-range communication module, the wired communication module, and the wireless communication module. The description related thereto is the same as described above.

The vehicle controller 120 may control the configuration inside the vehicle 100 as a whole.

The vehicle controller 120 may control the electronic device 150 based on the received control signal when the vehicle communicator 110 receives the control signal from the smart key device 400.

To this end, the vehicle controller 120 may be implemented with the memory storing an algorithm to control the operation of the components in the vehicle 100 or data about a program that implements the algorithm, and the processor carrying out the aforementioned operation using the data stored in the memory. The memory and the processor may be implemented in separate chips. Alternatively, the memory and the processor may be implemented in a single chip.

The electronic device 150 may include a door device, a lamp, a starter, and the like that can set a lock/unlock state of the doors 15L and 15R of the vehicle 100. However, the electronic device 150 is merely an example, and may include various configurations for providing various functions of the vehicle 100.

The power supply 130 may include a battery, which is a continuous power source that supplies power regardless of whether the vehicle 100 is started or not.

The power supply 130 may be connected to the gateway device 300, and the gateway device 300 may receive power from the battery, which is the continuous power source. In an example, the gateway device 300 may transmit the search signal for establishing communication connection or communication channel with the user terminal and may communicate with the user terminal 200 regardless whether the vehicle 100 starts operation or not.

At least one component may be added or deleted corresponding to the performance of the components of the gateway device 300 and the vehicle 100 illustrated in FIGS. 2 and 3. It will be readily understood by those skilled in the art that the relative positions of the components may be changed corresponding to the performance or structure of the system.

Each of the components illustrated in FIGS. 2 and 3 refers to a software component and/or a hardware component such as a Field Programmable Gate Array (FPGA) and an Application Specific Integrated Circuit (ASIC).

Figure 4:
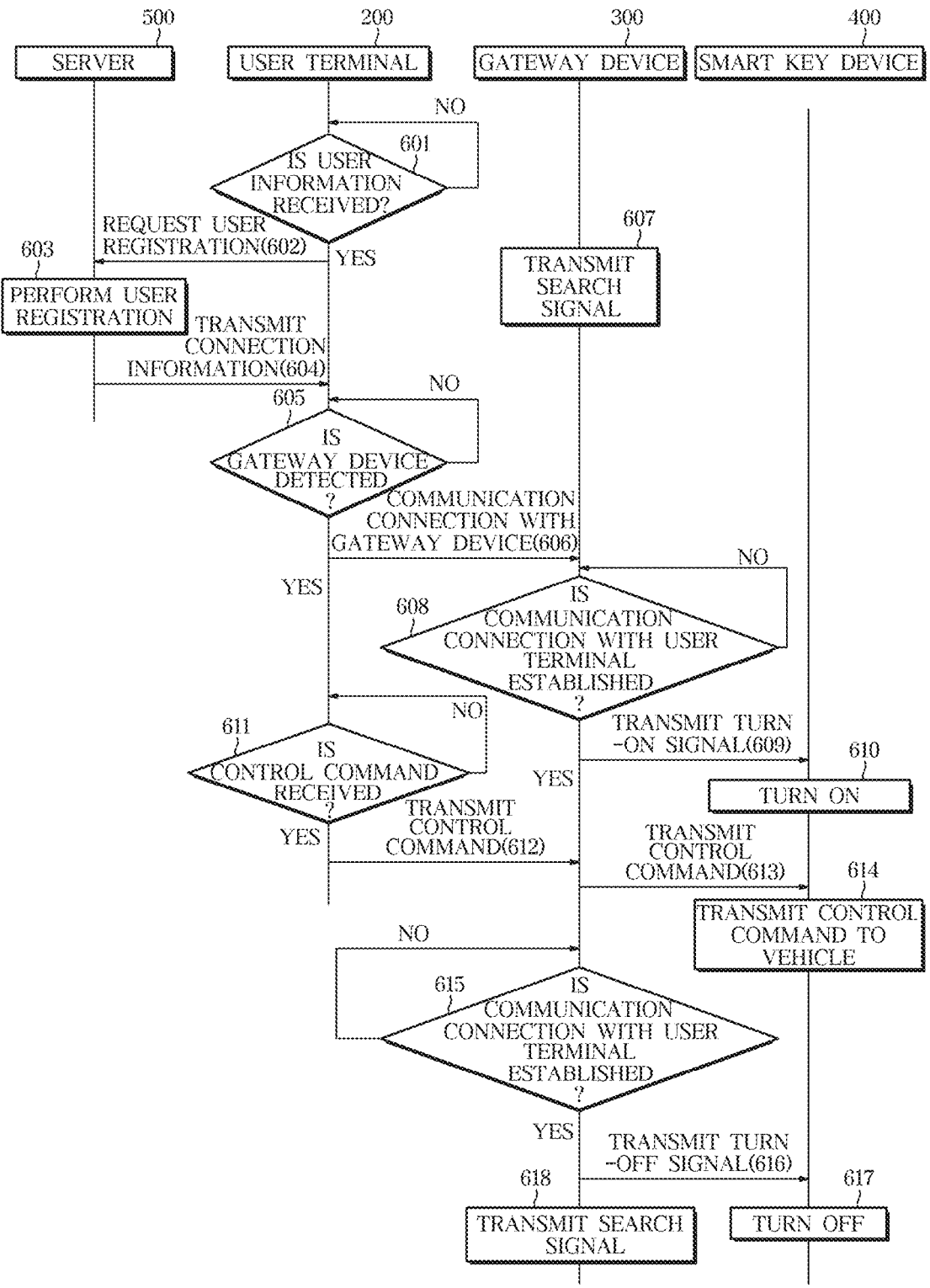
FIG. 4 is a flowchart illustrating an operation of a remote control system according to an embodiment.

FIG. 4 is a flowchart illustrating an operation of a remote control system according to an embodiment.

Referring to FIG. 4, the user terminal 200 of the remote control system 1 may confirm whether user information is received (601). To this end, the user terminal 200 may receive the user information from the user.

At this time, the user information may refer to information for identifying the user, and may include at least one of unique information about the user, vehicle information, or gateway device information. The gateway device information may refer to unique information of the gateway device 300, and may include, for example, product code information.

When the user information is received (YES in 601), the user terminal 200 may request user registration with the server 500 (602). At this time, the user terminal 200 may transmit the user information received from the user to the server 500.

The server 500 may perform the user registration by storing the received user information (603). Particularly, the server 500 may perform the user registration by storing not only the received user information but also the gateway device information corresponding to the received user information.

The server 500 may transmit connection information about the gateway device 200 corresponding to the gateway device information to the user terminal 200 (604). In this case, the connection information may refer to the connection information for communication connection to the gateway device 300 identified by the gateway information, and may include, for example, a Media Access Control Address (MAC address). However, the disclosure is not limited thereto and may include information for communication connection with the gateway device 300 on the wireless network.

The server 500 may match the connection information about the gateway device 200 corresponding to the gateway device information with the user information and the corresponding gateway device information, and may store the information.

To this end, the server 500 may include one or more components that enable communication with the external device, for example, at least one of the short-range communication module, the wired communication module, and the wireless communication module. The description related thereto is the same as described above.

In addition, the server 500 may include a storage, which may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM.

When the connection information for the gateway device 300 is received, the user terminal 200 may identify whether the gateway device 300 is detected by scanning the gateway device 300 based on the received connection information (605).

Particularly, the user terminal 200 may confirm whether or not the search signal including the connection information received from the gateway device 300 is received. When the search signal including the received connection information is received, it may be confirmed that the gateway device 300 is detected. At this time, the search signal may refer to the advertising packet.

When the gateway device 300 is detected (YES in 605), the user terminal 200 may perform the communication connection with the gateway device (606). Particularly, the user terminal 200 may transmit the response signal corresponding to the search signal of the gateway device 300 to the gateway device 300.

The gateway device 300 may transmit the search signal (607), and may confirm whether or not the communication connection with the user terminal 200 is established by identifying whether the response signal corresponding to the search signal is received from the user terminal 200 (608).

When communicating with the user terminal 200 (YES in 608), the gateway device 300 may transmit the turn-on signal to the smart key device 400 (609) and the smart key device 400 may be turned on (610).

The gateway device 300 may transmit the turn-on signal to the smart key device 400 based on the connection with the user terminal 200 authenticated by the server 500, e.g., the response signal received from the authenticated user terminal 200, thereby blocking access of the smart key device 400 to an unauthenticated user.

The user terminal 200 may confirm whether or not the control command is received from the user (611). When the user terminal 200 receives the control command from the user (YES in 611), the user terminal 200 may transmit the control command to the gateway device 300 (612).

When the gateway device 300 receives the control command from the user terminal 200, the gateway device 300 may transmit the received control command to the smart key device 400 (613), and the smart key device 400 may transmit the received control command to the vehicle 100 (614).

In embodiments, since the control command input by the user to the user terminal 200 is transmitted to the smart key device 400 through the gateway device 300, the user may utilize the user terminal 200 as a smart key without changing the smart key system provided in the vehicle. In one embodiment, in addition to the user terminal 200 that can communicate with the smart key device 400 in the vehicle via the gateway device 300 connected to the smart key device, a smart key that provided for controlling the vehicle can be used to communicate with the smart key device.

The gateway device 300 may confirm whether or not the communication connection with the user terminal 200 is released (615). When the communication connection with the user terminal 200 is released (YES in 615), the gateway device 300 may transmit the turn-off signal to the smart key device 400 (616).

Upon receiving the turn-off signal from the gateway device 300, the smart key device 400 may be turned off (617).

After transmitting the turn-off signal (616), the gateway device 300 may transmit the search signal (618).

Accordingly, the user may remotely control the vehicle 100 through the user terminal 200 without changing the system of the vehicle 100, thereby realizing the remote control environment using the user terminal 200 more easily. Further, since the system of the vehicle 100 is not required to be changed, a cost reduction effect may also be expected.

Figure 5:
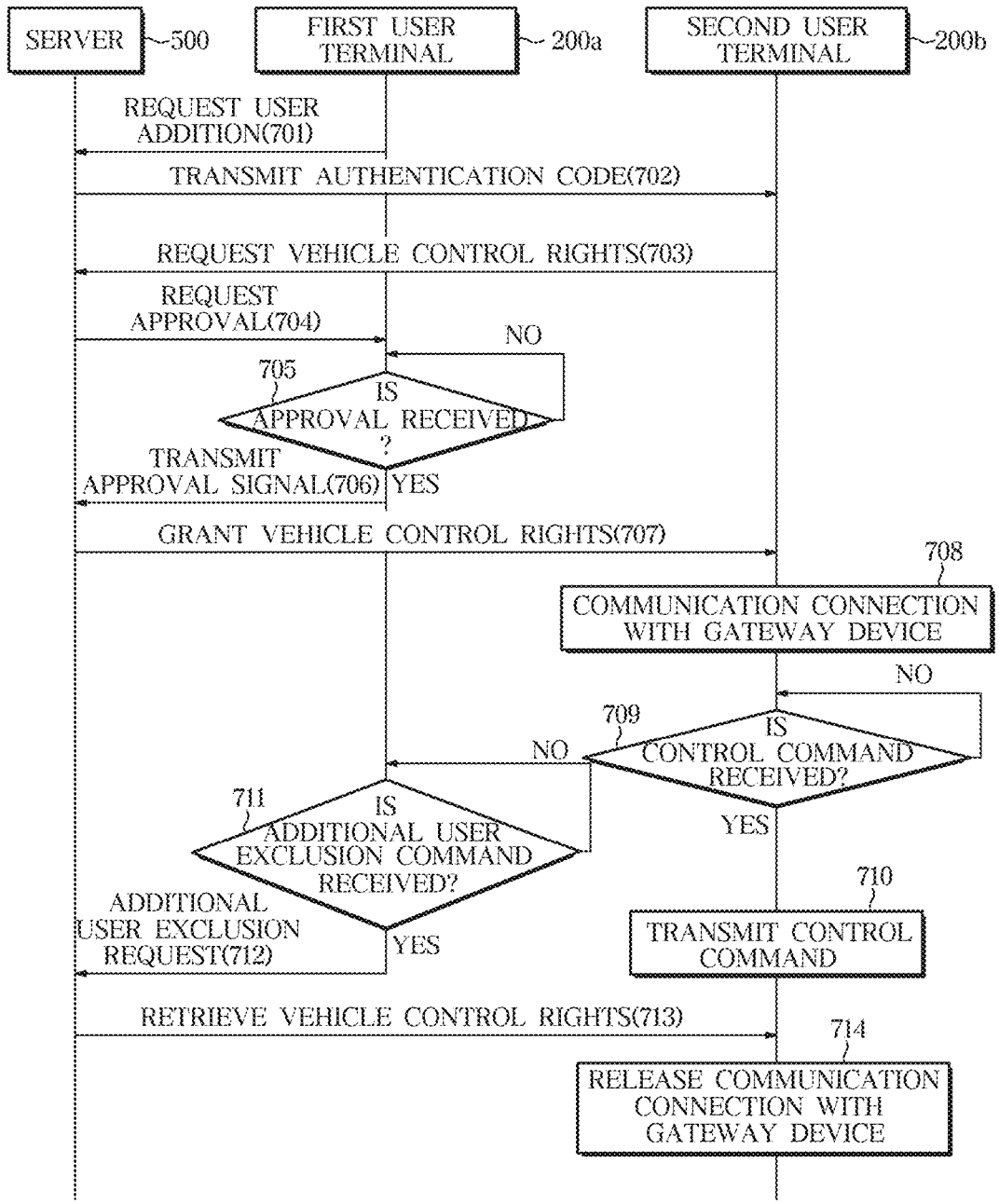
FIG. 5 is a flowchart illustrating an operation of a remote control system according to another embodiment.

FIG. 5 is a flowchart illustrating an operation of a remote control system according to another embodiment.

Referring to FIG. 5, the remote control system 1 may include the server 500 and a plurality of user terminals 200*a* and 200*b*.

In this case, the first user terminal 200*a* may be a master device and the second user terminal 200*b* may be a slave device. The first user terminal 200*a*, which is the master device, may refer to the user terminal 200 that has been registered in FIG. 5.

The first user terminal 200*a*, which is the master device, may make a user addition request to the server 500 (701), and the server 500 may transmit an authentication code to the second user terminal 200*b* (702).

The second user terminal 200*b* may request vehicle control rights to the server 500 (703). At this time, the second user terminal 200*b* may transmit the received authentication code to the server 500 together.

The server 500 may request an approval of a vehicle control rights request of the second user terminal 200*b* to the first user terminal 200*a* (704), and the first user terminal 200*a* may determine whether the approval is received (705). At this time, the first user terminal 200*a* may notify the vehicle control rights request of the second user terminal 200*b*, and the user of the first user terminal 200*a* may input approval of the vehicle control rights.

When the approval is received (YES in 705), the first user terminal 200*a* may transmit an approval signal to the server 500.

Upon receiving the approval signal from the first user terminal 200*a*, the server 500 may grant the vehicle control rights to the second user terminal 200*b* (707). In embodiments, the server 500 may grant rights to communicate with the gateway device 300 to the second user terminal 200*b*.

Particularly, the server 500 may grant the rights to communicate with the gateway device 300 to the second user terminal 200*b* by transmitting the connection information for communicating with the gateway device 300 to the second user terminal 200*b*.

When the second user terminal 200*b* is granted the vehicle control rights, the second user terminal 200*b* may perform the communication connection with the gateway device (708). When communicating with the second user terminal 200*b*, the gateway device 300 may turn on the smart key device 400 by transmitting the turn-on signal to the smart key device 400. The description thereof is the same as operations 608 to 610 in FIG. 4.

When the second user terminal 200*b* is connected to the gateway device 300, the second user terminal 200*b* may identify whether the control command is received from the user (709).

When the control command is received in the second user terminal 200*b* (YES in 709), the second user terminal 200*b* may transmit the control command to the gateway device 300 (710). At this time, the gateway device 300 may control the smart key device 400 to transmit the control command to the vehicle 100 by transmitting the received control command to the smart key device 400. The description thereof is the same as operations 611 to 614 in FIG. 4.

Meanwhile, the first user terminal 200*a* may identify whether an additional user exclusion command is received from the user (711).

When the additional user exclusion command is received (YES in 711), the first user terminal 200*a* may transmit an additional user exclusion request to the server 500 (712).

When the additional user exclusion request is received from the first user terminal 200*a*, the server 500 may retrieve the vehicle control rights of the second user terminal 200*b* (713).

Particularly, the server 500 may transmit a communication connection release command to the second user terminal 200*b*, and the second user terminal 200*b* may disconnect the communication connection with the gateway device 300 based on the communication connection release command.

Alternatively, the server 500 may transmit the communication connection release command to the gateway device 300, and the gateway device 300 may disconnect the communication connection with the second user terminal 200*b* based on the communication connection release command.

The gateway device 300 may confirm whether or not the communication connection with the second user terminal 200*b* is released. When the communication connection with the second user terminal 200*b* is released, the gateway device 300 may turn off the smart key device 400. Thereafter, the gateway device 300 may transmit the search signal again. The description thereof is the same as operations 615 to 617 in FIG. 4.

Thus, each of the plurality of users may remotely control the vehicle 100 through the plurality of user terminals 200*a* and 200*b*. Therefore, when the plurality of users use a single one of the vehicles 100 such as in a cascading manner, each user may remotely control the vehicle 100 through his/her user terminals 200*a* and 200*b*.

Also, the vehicle control rights may be granted to the second user terminal 200*b*, which is the slave device, only when the user of the first user terminal 200*a*, which is the master device, has approval. When there is the additional user exclusion command of the first user terminal 200*a*, which is the master device, the vehicle control rights of the second user terminal 200*b*, which is the slave device, is retrieved so that security may be maintained.

The vehicle and the remote control system including the gateway device as described above can provide the remote control environment using the user terminal that can be implemented more easily.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

Embodiments of the disclosure have thus far been described with reference to the accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A gateway device comprising:
a communicator configured to communicate with a user terminal and a smart key device; and
a controller configured to:
transmit, to the user terminal, a search signal for applying power to the smart key device;
transmit a turn-on signal to the smart key device when a response signal corresponding to the search signal is received from the user terminal; and
control the communicator to transmit a control signal to the smart key device when the control signal is received from the user terminal,
wherein the gateway device is physically connected with the smart key device,
wherein the communicator is configured to communicate with the smart key device through a connector including an electrically conductive material, and
wherein the connector is provided to be attached to the smart key device.

2. The gateway device according to claim 1, wherein the controller is configured to confirm whether the communication connection with the user terminal is released and to transmit a turn-off signal to the smart key device when the communication connection with the user terminal is released.

3. The gateway device according to claim 1, wherein the communicator is configured to communicate with the user terminal through Bluetooth, and
wherein the user terminal comprises a first user terminal which is a master device and a second user terminal which is a slave device.

4. A vehicle comprising:
a vehicle communicator;
an electronic device configured to provide at least one function;
a smart key device configured to communicate with the vehicle communicator;
a gateway device physically connected to the smart key configured to:
transmit, to a user terminal, a search signal for applying power to the smart key device;
transmit a turn-on signal to the smart key device when communication connection with a user terminal is established and to transmit a control signal to the smart key device when the control signal is received from the user terminal; and a controller configured to control the electronic device based on the control signal when the control signal is received from the smart key device, wherein the gateway device is configured to communicate with the smart key device through a connector including an electrically conductive material, and wherein the connector is provided to be attached to the smart key device.

5. The vehicle according to claim 4, wherein the gateway device is configured to confirm whether the communication connection with the user terminal is released and to transmit a turn-off signal to the smart key device when the communication connection with the user terminal is released.

6. The vehicle according to claim 4, further comprising: a power supply including a battery, wherein the gateway device is configured to receive power from the battery.

7. A remote control system comprising:

a user terminal configured to receive a control signal for a vehicle from a user;

a smart key device configured to communicate with an electronic device of the vehicle; and a gateway device physically connected to the smart key configured to:

transmit, to the user terminal, a search signal for applying power to the smart key device;

transmit a turn-on signal to the smart key device when a response signal corresponding to the search signal is received from the user terminal; and transmit the control signal to the smart key device when the control signal is received from the user terminal, wherein the gateway device is configured to communicate with the smart key device through a connector including an electrically conductive material, and wherein the connector is provided to be attached to the smart key device.

8. The remote control system according to claim 7, wherein the gateway device is configured to confirm whether the communication connection with the user terminal is released and to transmit a turn-off signal to the smart key device when the communication connection with the user terminal is released.

9. The remote control system according to claim 7, wherein the gateway device is configured to communicate with the user terminal through Bluetooth, and wherein the user terminal comprises a first user terminal which is a master device and a second user terminal which is a slave device.

10. The remote control system according to claim 9, further comprising:

a server configured to transmit connection information for communicating with the gateway device to the first user terminal.

11. The remote control system according to claim 10, wherein the server is configured to transmit an approval request to the first user terminal when a user addition request is received from the second user terminal.

12. The remote control system according to claim 11, wherein the server is configured to transmit the connection information to the second user terminal when the approval request is received from the first user terminal.

13. The remote control system according to claim 10, wherein the server is configured to transmit a communication connection release command to the second user terminal when an additional user exclusion request is received from the first user terminal.

* * * * *